United States Patent [19]

Tarantola et al.

[11] 4,354,892
[45] Oct. 19, 1982

[54] APPARATUSES FOR APPLYING ELASTOMERIC FILLERS TO TIRE BEAD-CORES

[75] Inventors: Luciano Tarantola; Cesare Migliarini, both of Milan, Italy

[73] Assignee: Societa Pneumatici Pirelli S.p.A., Milan, Italy

[21] Appl. No.: 192,862

[22] Filed: Oct. 1, 1980

[30] Foreign Application Priority Data

Oct. 9, 1979 [IT] Italy ............................. 26329 A/79

[51] Int. Cl.³ ........................................... B29H 17/32
[52] U.S. Cl. ................................... 156/398; 156/136; 156/460; 156/495
[58] Field of Search ................... 152/362 R; 156/136, 156/422, 460, 131, 132, 135, 205, 210, 462, 495, 398, 403

[56] References Cited

U.S. PATENT DOCUMENTS

| | | | |
|---|---|---|---|
| 3,077,000 | 2/1963 | Huisman et al. | 156/205 |
| 3,320,044 | 5/1967 | Cole et al. | 156/205 |
| 3,787,263 | 1/1974 | Yonekawa et al. | 156/136 |
| 3,909,338 | 9/1975 | Leblond et al. | 156/136 |
| 4,226,663 | 10/1980 | Pirovano et al. | 156/422 |
| 4,298,421 | 11/1981 | Pirovano | 156/460 |

*Primary Examiner*—Edward C. Kimlin
*Assistant Examiner*—Thomas Bokan
*Attorney, Agent, or Firm*—Stevens, Davis, Miller & Mosher

[57] ABSTRACT

An apparatus for automatically filling a vehicle tire bead-core with an elastomeric filler having one or more drums, for encasing the bead-core in which the filler is applied when the drum rotates around its own axis.

The apparatus is provided with means suitable for stretching the filler when it is pulled into rotation with the bead-core on the drum to stiffen the filler and resist bending, and therefore maintain the filler substantially in the drum midline.

The apparatus is further provided with means for discharging the bead-core/filler assembly in a plane unchanged with respect to that determined by the stretching means in order to permit the collection of the various filler/bead-core assemblies one after the other.

19 Claims, 9 Drawing Figures

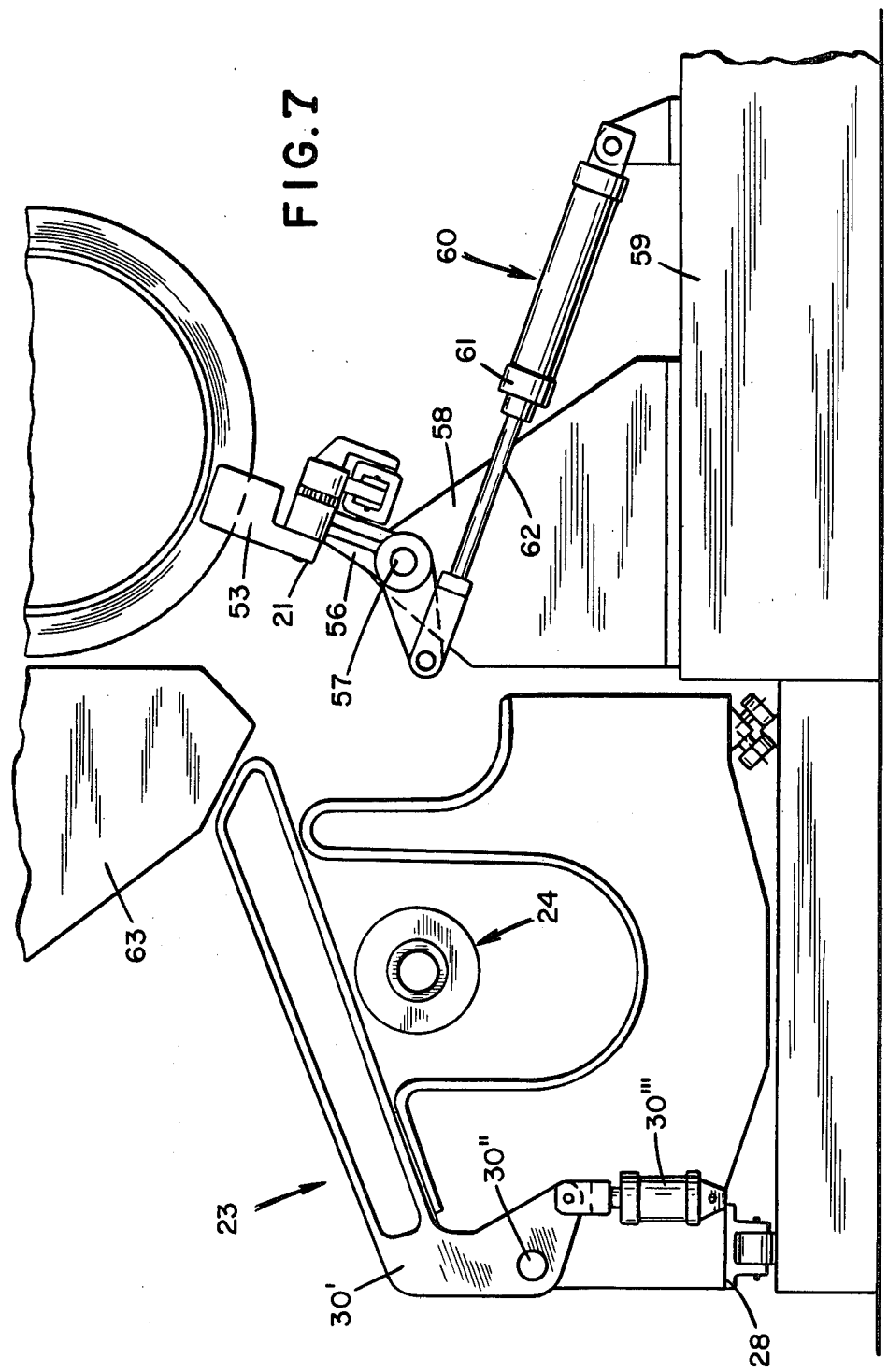

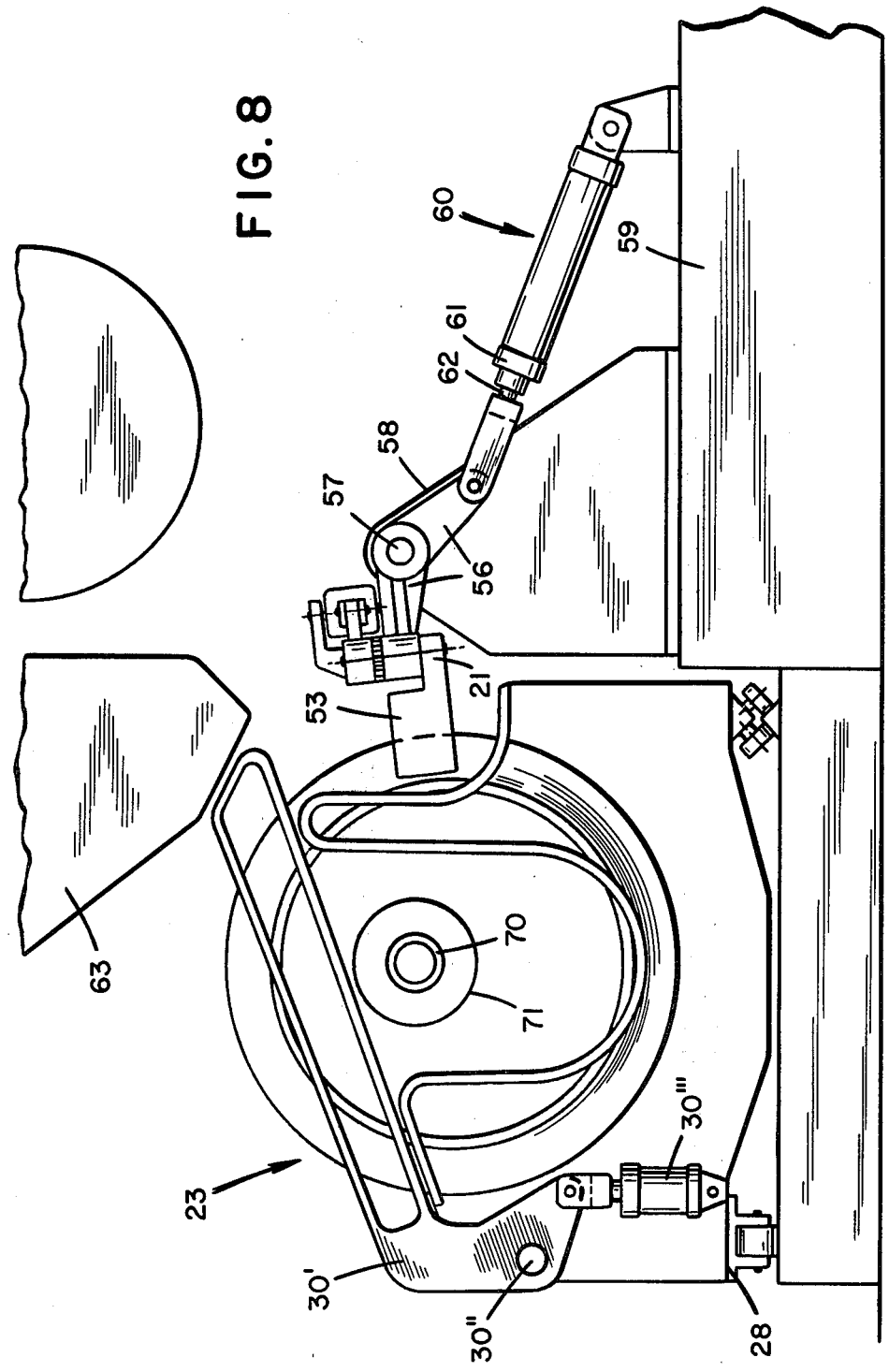

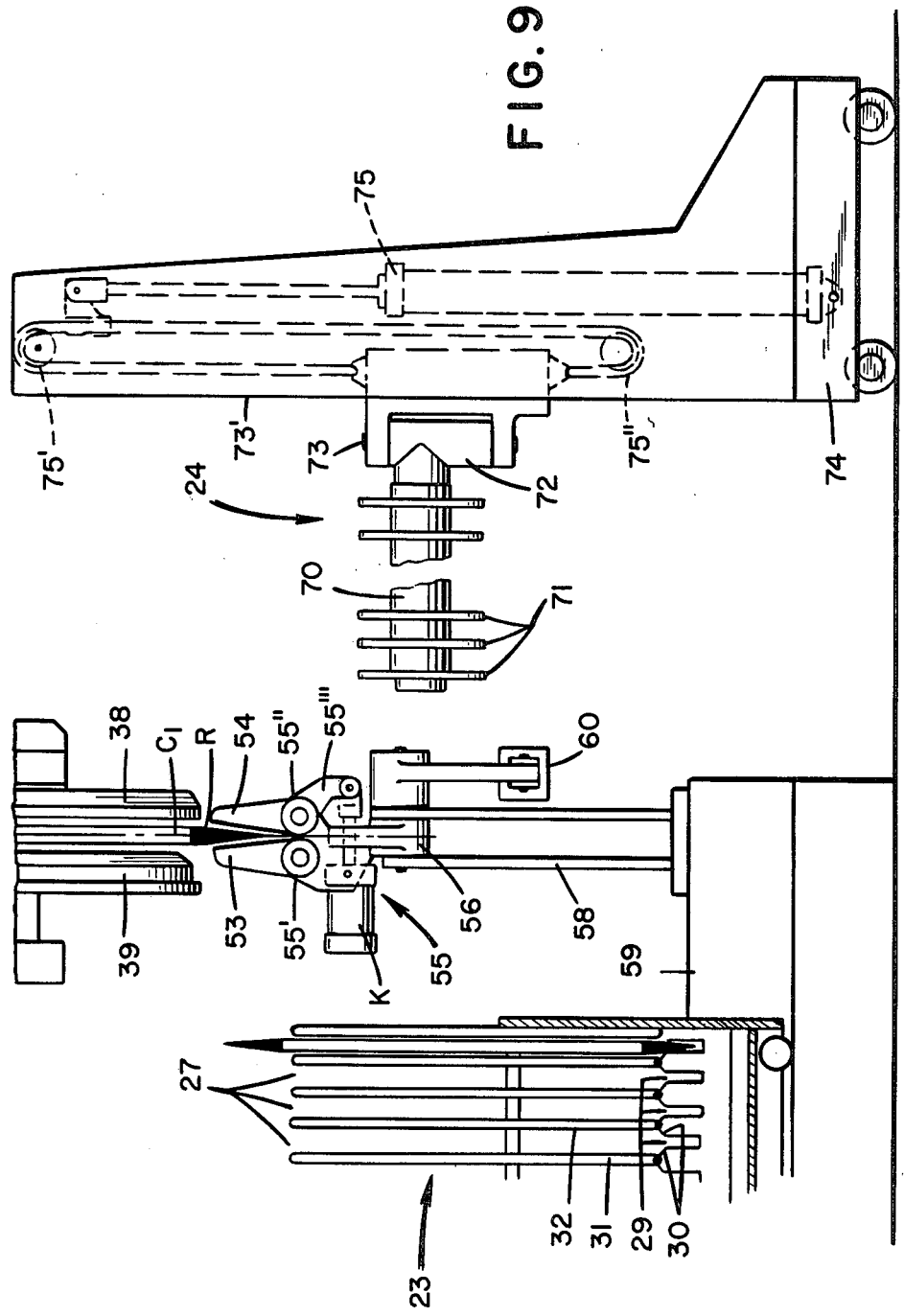

APPARATUSES FOR APPLYING ELASTOMERIC FILLERS TO TIRE BEAD-CORES

The present invention relates to improvements in apparatuses for inserting elastomeric fillers in tire bead-cores and, more particularly, to automatic apparatus for continuously assembling a filler with a bead core. The outer surface of a bead-core is rotated around its own axis and covered with a filler which is part of a continuous strip of unvulcanized material which is cut into a plurality of segments.

Generally such apparatuses comprise at least one drum adapted to provide a seat for encasing a bead-core, a disc with its axis of rotation parallel to the axis of the drum for rotating the drum with the relative periphery and for applying the filler to the bead-core, and means for butt-splicing the facing ends of the filler applied to the bead-core.

In the prior art apparatuses the various parts thereof are confined to a very narrow space and have the disadvantage of making it difficult to load and discharge the product.

A further drawback found in prior art devices is due to the fact that the loading and discharging operations are by hand which limits substantially the productivity of the apparatuses.

In some cases, for example, when the apparatuses have a drum provided with two separable flanges for discharging the product by dropping its own weight in a plane underlying the drum, it has been found that unacceptable deformations occur at the lip of the filler and often make it necessary to resort to manual operations for re-establishing the correct orientation of the filler so as to facilitate collection of the various filler/bead-core assemblies in regular and aligned order, the one after the other.

Also, there are further drawbacks depending on the shape assumed by the filler applied to the periphery of the bead-core, the shape being curved in one sense or in the other with respect to the midline of the assembly whose orientation is orthogonal to the axis of the bead-core, so that the discharging of the various assemblies is obstructed by the possibility of mechanical interferences between filler and eventual guiding surfaces very near to one another within which the filler must pass or between fillers and their collecting seats comprising successive walls within a distance of one another to permit the alignment and the subsequent simultaneous transport of the various assemblies from the apparatus to the machines for the final assembling on the tire carcass.

The causes originating curved profiles in the filler are substantially two.

A first cause of bending of the filler is that the continuous strip with a triangular transverse section from which the various segments are cut is often spirally wound with convolutions overlapped around a horizontal mandrel with an arrangement therefore tending to move or better to bend the thinner part of the strip from the median plane of the relative triangular section; consequently the filler is bent during and after the application of the filler to the bead-core.

There is a further cause of the filler bending which depends upon the same process of application around the bead-core in rotation around its axis. This cause is not dependent on the storing system of the elastomeric strip upstream of the applicator and also on the shape of the cross-section of the strip itself.

During this covering phase in fact the outermost profile of the filler is subjected to traction forces having the outermost profile to place itself on a circumference of diameter greater with respect to the inner profile in contact with the bead-core.

Because of the existence of traction forces, compression forces arise with components directed from the outermost edge towards the innermost one of the filler since the elastomeric material of the filler tends to respond with its elastic memory to expansion forces to which its outer part is subjected.

In those cases where the compression components in the relative cross-section of the filler is directed outside the base of the section itself, the upper part bends and the filler also bends which cause the above mentioned drawbacks.

Therefore, the present invention has as an object the improvement of an apparatus for assembling a bead core with a bead core filler to improve the productivity and to provide for automatic discharging of the final product without any one of the cited drawbacks. Another object of this invention is to provide an improved apparatus for making bead core and filler assemblies. Another object of the invention is to provide an improved apparatus for inserting a filler in a vehicle tire bead-core assembly. Still another object of the invention is to provide an apparatus for providing filled bead-cores which is devoid of the foregoing disadvantages and produces filled bead core assemblies for vehicle pneumatic tires at an improved production rate with automatic discharge of the finished article from the apparatus.

Other objects will become apparent from the following description with reference to the accompanying drawings wherein;

FIGS. 7 and 8 show the device with the filler and associated bead-core in two subsequent steps; and FIG. 9 illustrates the discharging device and the collecting system of a plurality of filler/bead core assemblies.

Figure 1:
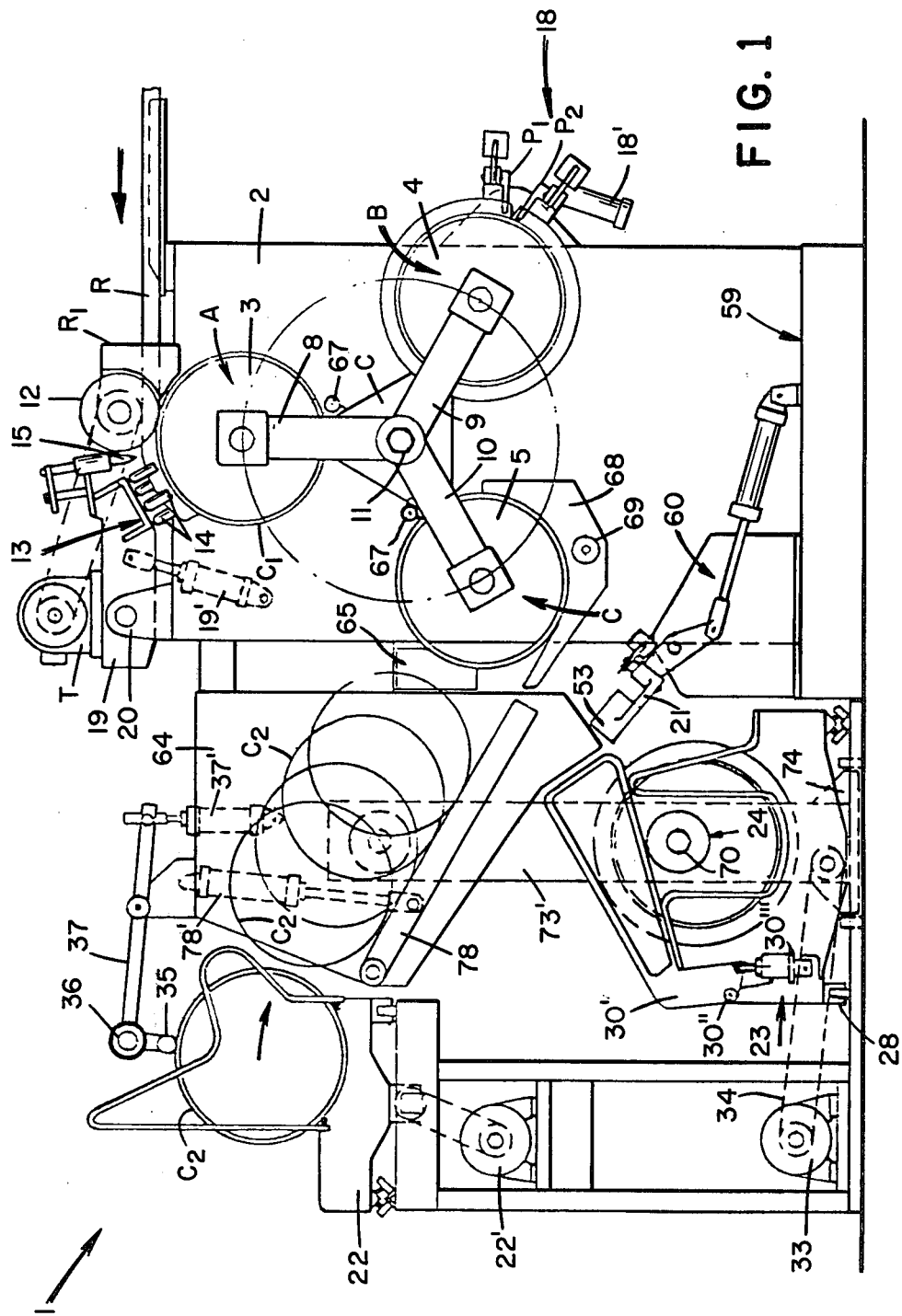
FIG. 1 is a front elevation of one embodiment of the apparatus having three drums provided by the invention.

The present invention provides an apparatus for automatically applying elastomeric fillers to tire bead-cores comprising, a frame to which are associated, at least one drum rotating around its own axis adapted to constitute the seat of a bead-core, a disc with its axis of rotation parallel to the axis of the drum for pulling into rotation the drum with the relative periphery and for applying the filler to the bead-core, apparatus for butt-splicing the ends of the filler and apparatus for loading the bead-core, said assembly apparatus being characterized by the fact of comprising, first means for orienting and maintaining the filler on the bead-core, before the discharging step substantially in the drum midline, second means for discharging the bead-core with the filler maintaining unchanged the orientation determined by the first means, said first means comprising a plurality of bodies having contour surfaces of metallic material or the like having similar sliding characteristic in contact with the elastomeric material of the filler, the bodies being assembled to idle in rotation around their own small shafts of rotation which are associated with a support of the frame with arrangement originating an undulate path through which the filler passes associated with the drum in rotation around its own axis so as to stretch the filler opposing the elastic return and bending with respect to the drum midline, the second means comprising a discharging device at localized action on the opposite sides of the filler with relative advancing mechanism of the device in the plane of the drum midline.

Consequently, a first essential characteristic of the invention is the plurality of bodies arranged in such a way as to intersect the trajectory run by the filler pulled into rotation on the drum with the consequence of deforming the sides of the filler according to a plurality of waves alternately concave and convex with respect to the midline of the drum perpendicular to its own axis of rotation.

Therefore, a kind of stiffening of the elastomeric material is determined in practice by the presence of the waves or corrugations in the filler and definitely a tendency to oppose the bending of the filler with respect to the midline of the drum.

Also, a second essential characteristic of the invention is the presence of a discharging device disposed for localized action on both sides of the filler so that it is possible in combination with a suitable advancing mechanism to translate the filler/bead-core assembly along a pre-determined plane without changing the orientation with respect to the midline of the drum so as to favor the collection of the various assemblies, for example according to seats placed side-by-side and in an unidirectional movement.

It is evident that this second characteristic overcomes advantageously the drawbacks of the past in which the discharging operation was made by manual systems not very productive or by a drum from which the filler was discharged to fall under its own weight with the bead-core with the risk that the curved profile of the filler might be damaged by the guiding walls or with other parts of the frame.

It is also understandable that the invention is not limited to apparatuses comprising only one drum but can have a plurality of drums and also the invention is applicable to filler strips applied to the bead-core by overlapping the ends or by butt-welding the facing ends and to drums of different formation, for example, with collapsible or expandable parts for the loading and the discharging operations or also to drums comprising two flanges separable from each other.

In fact the above two essential characteristics can be similarly applied in all of the indicated cases.

Preferably, the apparatus is adapted for the application of a filler of length equal to the outer development of the bead-core and comprises a disc for applying the filler to the bead-core as long as the two facing ends are open in the form of a "V" and means for orienting the "V" of the filler with respect to the butt-splicing means, the apparatus being, moreover, characterized by the fact of comprising three drums, a system of three arms supported by a rotating shaft associated to the frame with the drums fastened to the end of the arms in order to freely rotate around their own axes arranged parallel to the central shaft, the arms being oriented with one another at 120° and being situated in correspondence of three positions on the frame representing three stations taken up subsequently by each drum when the central shaft rotates, the first station comprising, the disc for applying the filler with ends open in the form of a "V" to the bead-core, the first means for determining an undulated path through which the filler passes when the disc pulls into rotation the drum, means for orienting the "V" of the filler with regard to the butt-splicing means arranged in another station, the second station comprising a means for butt-splicing the ends of the filler in the form of a "V", the third station comprising means for loading the bead-cores and second means for maintaining during the discharging operation the filler with its orientation determined by the first means in the first station.

Also in the preferred embodiment the apparatus is characterized by the fact that the plurality of bodies are constituted by small rollers forming a plurality of pairs arranged consecutively, the small rollers of each pair having axes inclined symmetrically with respect to the midline of the drum and the contour surface of each small roller going over at least partially with respect to the midline of the drum so as to originate on the filler passing through the pairs and when the drum rotates around its own axis, a plurality of undulations alternatively of opposite sign and of equal amplitude with respect to the midline.

In particular, the apparatus is characterized by the fact that the device for discharging the bead-core with filler associated therewith to the advancing mechanism has two jaws symmetrical with respect to the drum midline and means for driving the jaws during opening and closing operations with respect to the midline.

According to a particularly advantageous aspect with regard to quick discharge of the bead-core/filler assembly, the invention provides one or more drums, each constituted by two flanges reciprocally movable along the axis of rotation of the drum; in this case the apparatus is characterized by comprising with the discharging device at localized action on the facing sides of the filler and with the mechanism for advancing the discharging device, a system of forces directed parallel to the axis of the drum from the frame towards a side of the filler, the system of forces, when the two flanges of the drum are separated from each other, working in combination with the discharging device already acting on the filler to oppose axial movements of the filler with respect to the drum midline.

The apparatus provided by the invention is adapted for producing various filler/bead-core assemblies with continuous and automatic operations, mainly, for feeding bead-cores, for associating the filler with the bead-core and in particular for discharging and for gathering a large number of assemblies one after the other, for storing, or for transporting to a suitable department for particular treatments, or also for their immediate use in proximity of additional machines in continuous processes for the manufacture of tires.

The apparatus has characteristics that produce a large production rate and makes use of specific means adapted to orient the filler both during the application of the bead-core and during the discharging operation on the drum midline to which it is associated, so that the gathering of the various assemblies one behind the other is very easy.

Herebelow "midline" of the drum is the plane that, with respect to the bead-core encased in the corresponding drum seat, is orthogonal to the axis of the bead-core and divides the bead-core and the relative housing base into two equal parts.

Only by way of example the apparatus 1 (FIG. 1) is now described for the automatic assembly of fillers with a triangular cross-section with a bead-core, each filler being cut from a continuous non-vulcanized elastomeric strip which is cut into a plurality of segments with successive cuts in a direction substantially perpendicular to the advancing direction of the strip and with the length of each segment substantially equal to the outer development of the bead-core.

Therefore in this apparatus the filler after the application to the bead-core has the two ends of the lower profile coincident, and the ends of the upper profile circumferentially spaced or, in other words the facing ends of the filler are open in the form of a "V".

The apparatus 1 comprises a frame 2, three drums 3, 4, 5 for encasing corresponding bead-cores, a system for supporting the drums formed by two groups 6, 7 (FIGS. 1 and 6) of three arms 8, 9, 10 supported by a single central shaft 11 associated to the frame and rotating around its own axis.

Figure 6:
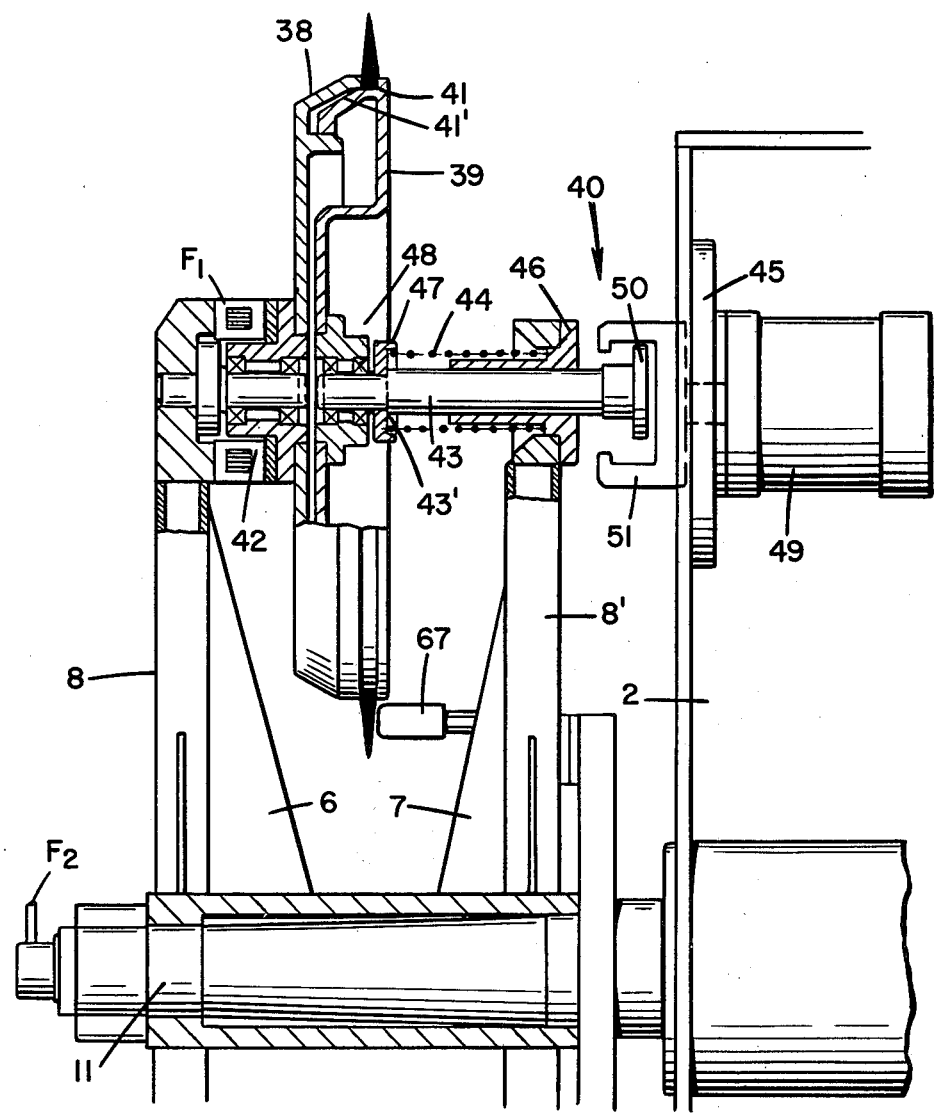
FIG. 6 illustrates an embodiment of a drum in cross-section.

FIG. 1 shows and illustrates the arms of the first group, while those of the second group are shown in FIG. 6 as numeral 8', oriented in the same direction, and underlying arm 8.

The arms of each group are oriented with each other at 120° and as indicated in FIG. 1, when the central shaft does not rotate, the arms are arranged in three positions on the frame representing three stations A, B, C taken up subsequently by each drum when the central shaft rotates, so that the apparatus can make simultaneously in the three stations, as explained later on, different operations of associating fillers with bead-cores.

In the first station A the apparatus comprises, a disc 12 with its axis of rotation parallel to the axis of the drum adapted to apply the filler to the bead-core, a plurality 13 of small rollers 14 to orient and to maintain the filler of the bead-core substantially in the midline of the drum still before this latter reaches the discharging station, a body 15 in the form of a "V" actuated by the stem 16 of a suitable cylinder 17 (see FIGS. 1, 2, 3) to orient the facing ends of the filler with respect to the butt-splicing means placed in the second station B. The body 15 and the butt-splicing means 18 in one of the possible embodiments are as described in U.S. patent application Ser. No. 959,338 filed Nov. 9, 1978 and assigned to the assignee of this application, the disclosure of which is incorporated herein now U.S. Pat. No. 4,226,663.

Figure 4:
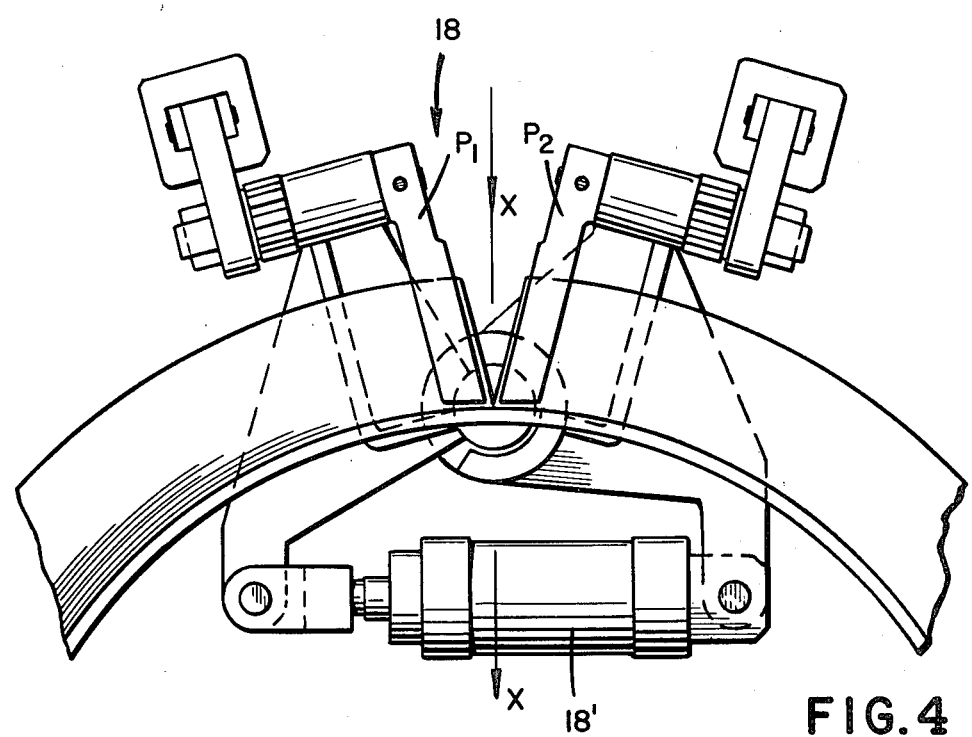
FIG. 4 illustrates a device for butt-splicing the ends of a filler in a station at 120° from the position illustrated in FIGS. 2 and 3.
Figure 5:
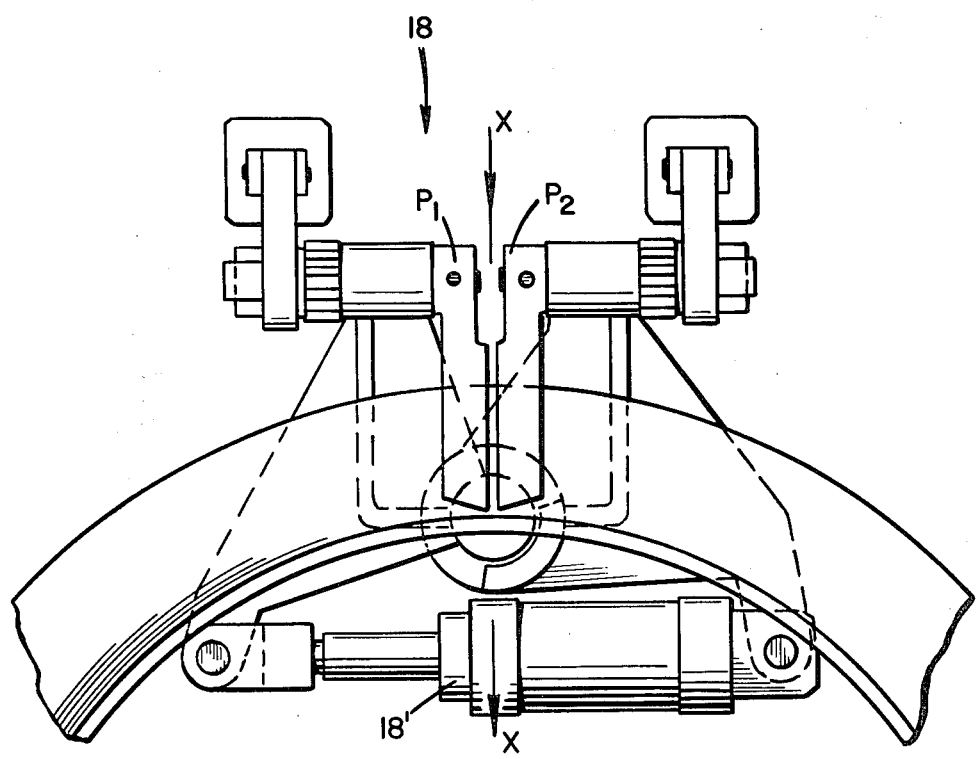
FIG. 5 illustrates the device of FIG. 4 at the end of the butt-splicing operation.

In particular the butt-splicing means 18 comprise two pairs of pliers $P_1$, $P_2$ suitable for clamping opposite sides of the filler in proximity of the ends in the form of a "V" and a mechanism 18' for moving the two pairs of pliers (see FIGS. 4, 5).

The disc 12, the plurality 13 of small rollers 14 and the cylinder 17 are associated on a single support 19 oscillating around a rotating pin 20 on the frame with its axis arranged parallel to that of the drum. The oscillation of the support is made through a fluid-dynamic cylinder 19' whose actuation permits the passage of the support from the position of FIG. 2 to that of FIG. 3 and vice versa.

The third station C has a discharging device 21 (FIG. 1) at localized action on facing parts of the filler with relative advancing mechanism of the device itself always in the midline of the drum which reaches the third station as a result of the rotation of the central shaft 11.

The apparatus is further provided with a system 22 with motor 22' for feeding the bead-cores towards the drums which reach little by little the third station C and in combination with the discharging device 21, a suitable collecting system 23 of the various bead-core/filler assemblies and a means 24 for contemporaneously taking a plurality of various assemblies encased in the collecting system 23.

The systems 22 and 23 have the characteristic of transporting the various bead-cores and the bead-core/filler assemblies in a single direction with axes of the various bead-cores aligned according to a direction parallel to the axis of the drum.

For example, the systems can be provided preferably as already described in the U.S. patent application Ser. No. 31,299 filed Apr. 18, 1979 of the same assignee now U.S. Pat. No. 4,298,421.

By summing up herebelow, the systems base themselves respectively on a plurality of housing seats 27 arranged one after the other (see FIG. 9), for example, on a slide 28; each seat in the system 23 has parts 30 opposite from one another in the final portion and at least two walls 31, 32 placed side-by-side.

The distance between the opposite parts 30 is shorter than the maximum width of the filler so as to support it as clearly shown in FIG. 9.

The slide is then moved by motor 33 with drive 34 (FIG. 1) with intermittent movements according to the rest time of the drum in the station C for the loading or discharging operations.

The feeding system 22, is provided (FIG. 1) with a pulley 35 moved by a motor 36 and supported by a lever 37 hinged on the frame and oscillating through a cylinder-stem group 37'. The pulley 35 placed with its periphery in contact with the development of the bead-core moves the relative seat towards the station C.

The following description is that relating to the essential characteristics of the invention, already mentioned and now explained in detail.

In particular, it is stressed that the essential characteristics are those adapted to form the filler around the bead-core with orientation in a single plane, corresponding to the midline of the drum, both in the initial phase of the formation of the filler and in the subsequent ones and in the discharging phase.

The orientation of the filler in the midline of the drum is made through the plurality 13 of small rollers 14 (FIGS. 2-3), having conical shapes or, preferably cylindrical shapes.

Figure 2:
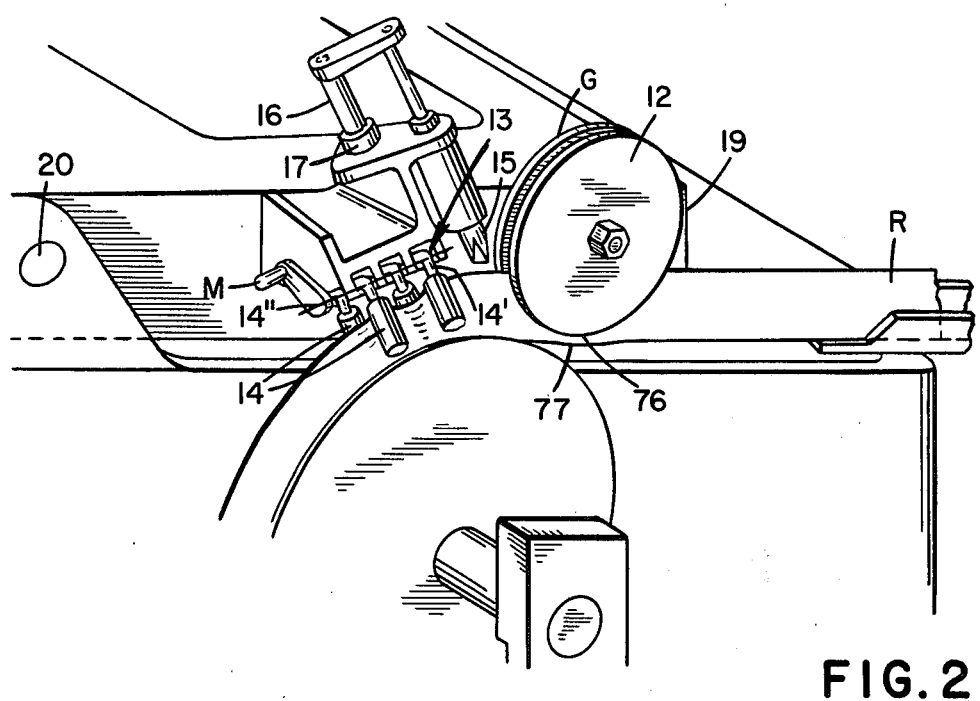
FIG. 2 is a fragmentary perspective view of the drum of the first station of the apparatus of FIG. 1.

The small roller 14 have metallic contoured surfaces and idle on small shafts 14' whose ends are connected with screws and nuts in suitable slots of the support 19 or, as shown in FIG. 2, around a small shaft 14" passing through suitable holes of the support and moved by the hand-lever grip M group.

On their whole, the small rollers are arranged to form a plurality of pairs, one after the other, with axes of the small rollers of each pair inclined symmetrically with respect to the midline of the drum, crossing one another in correspondence of the connections to the support, and with the contour surface of each small roller going partially over with respect to the midline.

In practice, the distribution of the small rollers originates an undulated path through which the filler passes gradually pushed by a suitable groove G of the disc 12 (FIGS. 2,3) against the bead-core to adhere and pulled by the rotation of the drum around the relative axis to slide against the contoured surfaces of the small rollers exerting on the elastomeric material a plurality of corrugations whose effect turns into a stiffening of the elastomeric material opposing the deviations of the filler from the midline of the drum.

In the above cited arrangement, the inclination of the small rollers can be varied for example by rotating in opposite senses to each other the two small rollers of each pair and therefore tightening the new position reached through the rotation of the hand grip M, and the fastening of a suitable nut at the end of the small shaft 14" or in other cited solution with the tightening of screws and nuts for each pair of small rollers or moving the screws along the slots for determining the right position of the various parts of small rollers with respect to the midline of the drum.

Always in the preferred embodiment, the apparatus is provided with a particular drum suitable for loading operations of bead-cores with the feeding system 22 and in particular for discharging operations of the bead-cores with fillers in combination with the discharging device 21 at localized action.

The characteristic elements of the drum and therefore the discharging device will now be explained for a better understanding of the invention.

Each drum (FIG. 6) comprises two flanges 38,39, first and second, reciprocally movable along the axis of rotation of the drum and a driving mechanism 40 for opening the flanges, the driving mechanism being one for all the drums and being arranged only in proximity of the station C on the frame.

The second flange has a cylindrical seat 41 for encasing the bead-core and a conical surface 41' for entering into the seat 41 to guide and to center the bead-core during the loading operation.

The first and the second flange are idle assembled on the respective first and second shafts 42, 43 alinged with each other and supported by two arms 8,8' both oriented in the same direction in the two groups of arms 6, 7.

The driving mechanism 40 has means 45 for moving the second shaft with respect to the first one in opposition to a spring 44 applied to each drum.

The spring 44 is applied around the final part of the second shaft between a sleeve 46 fixed to the arm 8' and a suitable envelope cup 47, this latter at one side in abutment on a step 43' of the shaft 43 and at the opposite part in abutment on the group of bearings 48 around which the second flange rotates freely.

The means 45 for moving the second shaft with respect to the first one comprise, a fluid-dynamic cylinder 49 associated to the frame 2 with its axis parallel to that of the drum in the position corresponding to the station C, an end flange 50 on the second shaft 43, a hook 51 associated to the stem of the cylinder 49. The hook is placed outside the trajectory run by the end of the second shaft when it moves from one station to the subsequent one pulled by the rotation of the three arms system around the shaft 11.

In the conditions shown in FIG. 6, the second and first flanges are closed in consequence of the action exerted by the spring 44 and of the fact that the appendix 50 and the hook 51 do not interfere.

The opening of the flanges depend on the actuation of cylinder 49 and on the resulting interference between hook 51 and appendix 50.

The apparatus can be provided with drums having shapes different from the preferred one now described or also of the type with separable parts different from the two flanges, for example, a bell and a flange, or also with expandable and collapsible sectors or with any other suitable means to provide a housing seat for a bead-core.

Obviously, for any suitable type of the contemplated drums may be used devices for localized action on opposite sides of the filler, i.e., devices with at least two pressure elements acting with opposite thrusts on the sides of the filler, suitable for blocking and maintaining the filler in space when the bead-core with the filler is no longer supported by the drum, both for the collapsing of the sectors in a sector drum and for the detachment of the two parts of the drum in the axial direction.

Still in the preferred embodiment relating to the drum provided with two flanges, the more suitable discharging device 21 comprises two jaws 53, 54 symmetrical with respect to the midline of the drum arrived at station C (FIG. 9) and means 55 for opening and closing the jaws with respect to the midline. The means can be different and in particular based on the same connections and gearing used also for the butt-splicing means in the second station, i.e. pliers $P_1$ and $P_2$ (see FIGS. 4,5).

In particular, means 55 have two sprocket wheels 55' and 55" meshing together at the end of the jaws and a lever 55'" associated at one end of the sprocket wheels and at the opposite end to the stem of a cylinder K.

The jaws and the means 55 are then bound to a single supporting structure 56 connected by means of a hinge 57 to the vertical plate 58 (FIGS. 7,8) secured to the horizontal base 59 of the frame.

The hinge 57 has an axis of rotation parallel to that of the drum in station C and the rest position of the jaws is maintained or is changed by the action of the driving mechanism 60 comprising a fluid-dynamic system with cylinder 61 and stem 62 acting on the supporting structure 56 for moving on the midline of the drum, the filler from the center between the flanges toward a housing seat of the collecting system 23.

Preferably, a system is provided for guiding the filler formed by two parallel plates 63, 64 (FIGS. 1, 7, 8) secured to parts of the frame between the drum and housing seat of the collecting system 23 arranged on the midline of the drum.

The invention also contemplates, in connection with the drum constituted by the two flanges, the use of further characteristics to maintain the filler in the midline of the drum also when the two flanges separate from each other.

Therefore, the apparatus comprises, in combination with the two jaws already acting on the filler in the lower part, a system of forces directed parallel to the axis of the drum, the forces being adapted to oppose axial movements of the filler in the remaining part of its peripheral development not blocked by the jaws 53, 54.

In the preferred embodiment the system comprises at least two abutting surfaces, the first 65 integral (see FIG. 1) with the frame in station C, the second always on the same side with respect to the midline of the drum, constituted by a pin 67 transported by the second group of arms for each drum (see FIGS. 1 and 6).

As stated above, in the station C where the discharging operation occurs, the loading of the bead-core coming from the feeding system 22, bead-core directed at first towards the guiding plates 63-64 described as guiding elements used during the discharging operation, and finally (see FIG. 1) towards a suitable cradle 68 with periphery adapted to receive and to encase a bead-core being provided with suitable magnetic means are contemplated.

The cradle placed outside the drum and in proximity of the lower portion, is then movable axially towards the drum with a suitable fluid-dynamic drive whose stem 69 is connected to the cradle center; in this way the cradle can be borne between the two flanges of the drum in correspondence of the midline corresponding to the loading position or drawn away when the drum pulled by the arms is in rotation around the central shaft 11.

The description of the apparatus is completed making reference to further means 24 for taking contemporaneously a plurality of filler/bead-core assemblies already inserted in the seats of the collecting system 23.

Means 24 comprise a mandrel 70 (see FIG. 9), a plurality of discs 71 placed side-by-side and coaxially secured to the mandrel, a vertical column 72 rotating around its own axis 73 and adapted to maintain the mandrel in a horizontal position, means for the movement of the mandrel in a direction parallel to the axis of the drum toward the inside of the filler/bead-core assemblies encased in the seats of the collecting system, means for the vertical movement of the mandrel from a lower horizontal position to an upper horizontal position to lift and to support the various assemblies between the discs.

Any suitable means for movement of the mandrel and for the vertical movement can be used, for example, the column can be mounted on the structure 73' of a suitable trolley 74 movable by hand or with a motor; the column then slides in a longitudinal groove (not shown) of the structure 73' since it is subjected to the action of a chain moved by a cylinder 75, the chain passing around pulleys 75'-75" fixed to the end of the structure 73'.

The operation of the apparatus is now described starting from station A where a drum with the relative bead-core C1 (FIGS. 1,2) is already present.

During this step an elastomeric filler R already cut to a length corresponding to the peripheral development of the bead-core is passed at first through a suitable slot $R_1$ then through the groove G (FIG. 2) of the disc 12 rotated by its own motor T so as to adhere to the bead-core $C_1$ on its turn in rotation with the drum through the contact between the periphery 76, 77 of the disc and of the drum.

Always in consequence of the rotation of the drum, the filler is obliged to keep a tight contact between the plurality 13 of the small rollers 14 following an undulated path determined by the fact that the contoured surfaces of the small rollers go over at least for a certain portion of their development with respect to the midline of the drum.

Therefore in this step, as visible in FIG. 2, the filler is deformed by the small rollers of each pair with undulations of opposite sign with respect to the midline of the drum.

In practice, the upper portion of the filler is in contact with the small rollers, arranged as indicated, and develops a path longer than that which could be obtained in the absence of the small rollers, remaining therefore said portion subjected to an elongation whose effect turns into an opposition action to the elastic memory of the elastomeric material tending to react with comparison components from the outermost edge toward the innermost of the filler itself with the consequence of possible bending in one sense or in the other with respect to the midline.

Consequently, the stretching action of the small rollers on the filler favors orientation in the midline of the drum and avoids bending which constitutes a great advantage for the subsequent discharging operation of the whole assembly according to the midline itself.

Of course, the pairs of small rollers can be of a number different from that represented in FIG. 2 and their interference with respect to the midline of the drum can be easily varied by rotating opportunely the grip hand M.

At the end of the stretching step, provision is made for the centering of the facing ends in the form of "V" of the filler with respect to the butt-splicing means 18 arranged in the second station R. This operation takes place (FIGS. 2, 3) by setting in action the cylinder 17 so that the stem 16 leads the body in the form of "V" 15 to the inside of the ends in form of a "V" of the filler determining in this way a pre-determined angular relation between the ends of the filler and the plane of symmetry XX (FIGS. 4, 5) between the two pairs of pliers $P_1$, $P_2$ of the means 18 in the station B.

The right position of the filler with respect to means 18 when the body 15 is moved upwards is then maintained by the actuation of a suitable electromagnetic brake F1 (FIG. 6) of known type inside the drum and fed with wires F2 through a slip ring (not shown); the effect of the brake is that of avoiding rotation of the drum with respect to its own axis and therefore loss of the orientation of the "V" of the filler during the moving phase from station A to B.

Figure 3:
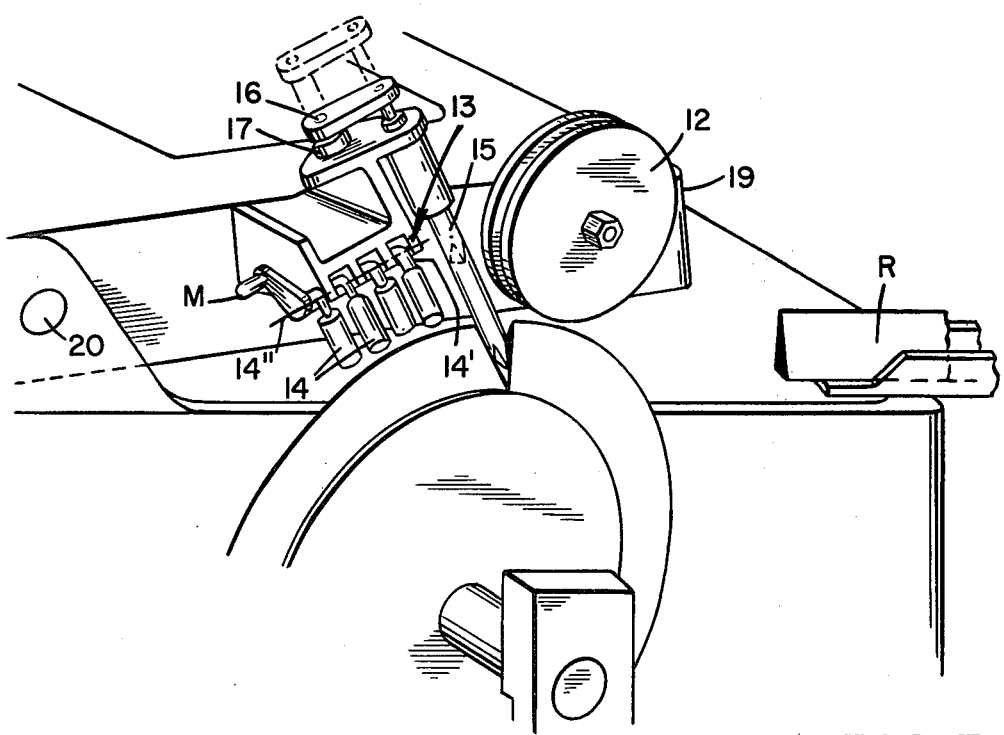
FIG. 3 shows the drum illustrated in FIG. 2 in a subsequent step.

The subsequent operation of drawing away the small rollers 14, disc 12 and the fluid-dynamic control of the body 15, acting on the cylinder 19' and producing an oscillation of the support 19 around the hinge 20 from the position of FIG. 2 to that of FIG. 3 can be achieved.

In these conditions the drum, for rotation of 120° of shaft 11, passes from the station A to station B with the midline of the "V" of the filler exactly coinciding with that of symmetry XX between the pliers $P_1$, $P_2$.

In the subsequent step, the pliers $P_1$ and $P_2$ and therefore the mechanism 18 originate the butt-splicing of the two facing ends of the filler, as stressed in the passage from FIG. 4 to FIG. 5, and as already explained in U.S. Pat. No. 4,226,663.

At the end of this step, the shaft 11 is rotated 120°, as long as the drum passes with the filler from station B between the jaws 53, 54 of station C (see FIG. 9) where the discharging steps of the filler R/bead-core C1 assembly takes place as follows: at first the cylinder K is actuated so that the relative stem beings through the lever 55''' the rotation of the two sprocket wheels 55' and 55" associated with the jaws 53 and 54 and these latter consequently approach reciprocally with respect to the midline of the drum and exert localized pressures equal and opposite on the lower portion of the filler.

At this point the filler is blocked in space with respect to the frame in the midline of the drum corresponding to the position of the opposed and closed flanges.

Consequently, alignment is achieved between the filler/bead-core assembly pressed between the jaws 53, 54 and the median plane of a housing seat (see FIG. 7)

of the collecting system 23 of the various filler/bead-core assemblies.

Subsequently, the driving mechanism 40 (FIG. 6) is initiated for opening the two flanges 38 and 39 of the drum, fluid is inserted in the inside of the cylinder 49 so that the relative stem in FIG. 6 removed from the left side toward the right side, makes the hook 51 interfere with the appendix 50 of the second shaft 43 exerting such a force as to withstand the action of the opposition spring 44 and consequently causing the detachment of the flange 39 from the flange 38 and the opening of the drum.

The invention also in this step provides very favorably a system of forces adapted to prevent the filler blocked only in the lower part by the jaws 53, 54 from moving laterally following the bead-core applied with force during the loading to the cylindrical seat 41 of the second flange now in phase of lateral movement toward the frame 2.

In fact, always in the cited detaching, step of the flange 39 and of the flange 38, lateral movement of the upper portion of the filler is immediately opposed by the presence of the abutting surface 65 integral with the frame 2 and of the pin 67 associated with the second group of arms (see FIGS. 1,6).

Therefore it can be affirmed that the discharging device 21 at localized action and the abutting surfaces 65, 67 placed on the same part with respect to the midline of the drum constitute a system of forces adapted to maintain the filler in an unchanged plane with respect to that of the other station even when the drum is in its opening phase and for any value of force rendered necessary at the beginning to insert and to center the bead-core in the seat of the second flange.

In a further step, the cylinder 61 of the advancing mechanism 60 is set in action causing through the stem 62 the rotation of the supporting structure 56 and therefore of the jaws with the filler/bead-core assembly; during this movement the bead-core with the filler passes from the position between the flanges 38 and 39 of the drum (FIG. 9) through the guiding plates 63, 64 (FIG. 8) up to be included exactly in the housing seat of the collecting system 23 of the various assemblies; this system 23 in its turn immediately after the loading of the assembly is set in motion in a direction parallel to the axis of the drum to provide a new empty housing seat in correspondence of the midline of the drum 4 in this step still in station B for butt-splicing the ends of a further filler applied to a further bead-core.

At last the loading phase of a bead-core on the drum in opening position in station C is provided and precisely: at first the cradle 68 is removed from the inactive position in proximity of the drum located and defined by the flanges 38, 39 when they are closed; then, as already explained in U.S. Pat. No. 4,298,421, the pulley 35 (FIG. 1) is set in action by making it rotate around its axis through the motor 36, and by inclining opportunely the lever 37 with the relative aid of the cylinder-stem group 37', emergence of bead-core C2 is initiated with a tangential force exerted by the pulley 35.

In this way the bead-core C2, guided between the containment plates 63–64 rolls along the path 78 already provided with the drive 78' and reaches the periphery of the cradle 68 where it is kept in fixed position by the magnetic means.

Subsequently the drive 78' is actuated so as to lift the drive 78 to avoid mechanical interferences in the trajectory followed by a further bead-core with the filler in the discharging phase.

At last, the fluid-dynamic cylinder 49 is actuated (FIG. 6) by the action of the spring 44 to move the flange 39 towards the flange 38, determinating in this way the centering of the bead-core with respect to the conical surfaces 41' for the inlet of the second flange and then the insertion of the bead-core in the annular seat 41.

At the end of this latter step, the cradle 68 is brought again in the original position and is rotated intermittently the shaft 11 of 120°, so as to bring cyclically each of the three drums in the positions corresponding to the three stations A, B, C to repeat the various assembling phases explained before.

It has been indicated previously that the association of the apparatus with a mandrel 70 adapted to take contemporaneously a plurality of filler/bead-core assemblies already signed in the housing seats of the collecting system 23.

The mandrel is inserted inside the various assemblies and then lifted with the column 72 so as to take the assemblies (see FIG. 9).

Obviously, in the case in which the housing seats of the collecting system 23 comprise an upper wall 30' for guiding more completely the filler in the discharging step from station C, wall 30' is oscillated around a hinge 30'' (see FIG. 1) and the rotation with drive and lever 30''' is caused to lift the mandrel 70 and to take contemporaneously various assemblies.

The apparatus has the advantage of a high production rate since contemporaneously in different stations are made different assembling operations on three different filler/bead-core assemblies.

In particular it is evident that the advantage of associating the three-drums system with systems for transporting bead-cores and bead cores with relative fillers comprises the common characteristic of gathering in a narrow space a plurality of said elements.

Consequently it is clearly understandable that the apparatus has the further advantage of being used on automatic lines at high productivity for building machines with the various filler/bead-core assemblies.

Although some particular advantageous embodiments of the apparatus have been described, it is understood that the invention includes in its scope any other alternative embodiment accessible to a technician of the field and not excluded by the claims.

For example, the plurality 13 of small rollers 14 can be placed in a station different from that shown in FIGS. 2 and 3, or in the station A and also in the station B or alone in a further station or in combination with small rollers in other stations.

The essential condition to be respected in any station in which the small rollers are included, is that the filler is obliged to pass among them according to an undulated path when the drum associated with the filler is pulled into rotation around its own axis or for the presence of a disc as that of FIGS. 2, 3 or of other motors.

Clearly the arrangement of a plurality of small rollers in a plurality of stations or an high RPM of the drum over which the filler passes among the small rollers, increases the stretching of the filler and therefore opposes much more the tendency to bend.

It is also evident that the small rollers can have metallic surfaces or surfaces equivalent to metal sliding characteristics between the small roller surface and the elastomeric material of the filler.

Also by way of example the apparatus can have a larger number of drums than that indicated in the example and loading and discharging positions in different stations or also distribution of the orienting and butt-splicing means seen now in stations A and B, arranged in a different way according to other solutions.

What is claimed is:

1. An automatic apparatus for assembling an elastomeric filler with a vehicle tire bead-core comprising a frame, and associated with the frame at least one drum rotating around its own axis adapted to provide a seat for a bead-core, a disc having an axis of rotation substantially parallel to the axis of the drum for initiating rotation of the drum with the relative periphery and for assembling the filler with the bead-core, means for butt-splicing the ends of the filler together, and means for loading the bead-core, said apparatus being characterized by the fact of comprising, first means for orienting and maintaining the filler assembled with the bead-core before it is discharged substantially on the drum midline, second means for discharging the bead-core with the orientation of the filler determined by the first means, unchanged, said first means comprising a plurality of bodies having contoured surfaces with a sliding characteristic corresponding to that of a metal in contact with the elastomeric material of the filler, said bodies being assembled to idle on its own small shaft of rotation associated with a support of the frame with an arrangement originating an undulated path through which passes the filler associated to the drum in rotation around its own axis thereby stretching the filler and opposing elastic return and bending with respect to the drum midline, said second means comprising, a discharging device at localized action on the opposite sides of the filler with relative advancing mechanism of said device in the plane of the drum midline.

2. The apparatus of claim 1 for applying a filler of length equal to the outer development of the bead-core where the disc applies the filler to the bead-core as long as the two facing ends are open in the form of a "V", comprising means of orienting the "V" of the filler with respect to the butt-splicing means, said apparatus being characterized by the fact of comprising three drums, a three arms system supported by a rotating shaft associated with the frame with drums assembled at the ends of the arms to freely rotate around their own axes arranged parallel to the central shaft, said arms being oriented to one another at 120° and being situated in correspondence of three positions on the frame representing three stations taken up subsequently by each drum when the central shaft rotates, the first station comprising, the disc for applying the filler to the bead-core with ends open in the form of a "V", the first means for determining an undulated path through which the filler passes when the disc initiates into rotation of the drum, the means for orienting the "V" of the filler with regard to said butt-splicing means, the latter being arranged in a further station, the second station comprising said means for butt-splicing the ends in the form of a "V" of the filler, the third station comprising means for loading the bead-core and a second means for maintaining during the discharging step the filler with its orientation determined by the first means in the first station.

3. The apparatus of claim 2, characterized by the fact that the disc and the first means comprising the plurality of bodies for orienting and maintaining the filler in the drum midline and the means for orienting the "V" of the filler are associated on a single support oscillating around a rotating pin on the frame with axis arranged parallel to the drum axis.

4. The apparatus of claim 1, 2 or 3 characterized by the fact that said plurality of bodies are constituted by small rollers forming a plurality of joints arranged one after the other, the small rollers of each joint having axes inclined symmetrically with respect to the midline of the drum and the contour surface of each small roller going over at least partially with respect to the drum midline so as to originate on the filler passing through the joints and when the drum rotates around its own axis, a plurality of undulations alternatively of opposite sign and of equal amplitude with respect to said midline.

5. The apparatus of claim 4, characterized by the fact that said small rollers of each joint comprise means for varying the inclination with respect to the drum midline.

6. The apparatus of claim 1 or 2, characterized by the fact that said device for discharging the bead-core with the filler associated with the advancing mechanism comprises two jaws symmetrically with respect to the drum midline, means for setting in action said jaws during opening and closing operations with respect to said midline.

7. The apparatus of claim 6, characterized by the fact that the jaws and the means for setting in action said jaws are connected to a single supporting structure hinged to a plate of the frame with axis of rotation of the hinge parallel to the axis of the drum and said advancing mechanism of the device comprises a fluid-dynamic system with cylinder and relative stem suitable for the rotation of said supporting structure around the hinge applied to said plate of the frame.

8. The apparatus of claim 7, comprising in combination with the discharging device applied to said supporting structure, a system for collecting the bead-core/filler assembly adapted to transport the various assemblies with aligned bead-core axes and comprising, a plurality of housing seats arranged one after the other, means for advancing said plurality of seats in a direction parallel to the drum axis, each seat comprising at least two walls placed side-by-side and a bearing base for the outermost profile of the filler.

9. The apparatus of claim 8, comprising between the drum and the seats for encasing the various assemblies one at a time arranged on the drum midline, two guiding plates symmetrically arranged with respect to the drum midline and applied to fixed parts of the apparatus, between said two guide plates the bead-core/filler assembly being transported when said supporting structure of the discharging device rotates towards said collecting system.

10. The apparatus of claim 8, comprising means for taking simultaneously a plurality of said assemblies of the collecting system.

11. The apparatus of claim 10, wherein said taking means comprises a mandrel, a plurality of discs placed side-by-side and coaxially secured to the mandrel, a vertical column rotating around its own axis to which is connected the mandrel in a horizontal position, means for moving the mandrel in a direction parallel to the drum axis towards the inside of the filler/bead-core assemblies encased in the seats of the collecting system, means for vertically moving the mandrel from a lower horizontal position to an upper horizontal position whereby the various assemblies are lifted to a position and supported between said discs placed side-by-side.

12. The apparatus of claim 1 or 2 comprising at least one drum comprising two flanges reciprocally movable along the axis of rotation of the drum to permit the loading of a bead-core and discharging of the bead-core with the filler, comprising with the discharging device at localized action on the facing sides of the filler and with said mechanism for the advancing of the discharging device, a system of forces directed parallel to the axis of the drum from the frame towards a side of the filler, said system of forces, when the two flanges of the drum are separated from each other, working in combination with the discharging device already acting on the filler to oppose axial movements of the filler with respect to the drum midline.

13. The apparatus of claim 12, wherein the system of forces for opposing axial movements of the filler when the drum is in discharging steps, comprise at least two abutting surfaces in stationary position with respect to the axial movement of the flange of the drum to which said abutting surfaces are laterally opposed.

14. The apparatus of claim 13, comprising a cradle with a periphery suitable to receive and to encase a bead-core with axis parallel to the axis of the drum, magnetic means for maintaining the bead-core on the periphery of the cradle, a fluid-dynamic cylinder secured to the frame with stem associated to the cradle for movement of the same in a direction parallel to the axis of the drum from a rest position far from the drum up to a loading position in which the bead-core is encased in the profile of the cradle between the two flanges of the drum in opening.

15. The apparatus of claim 14, comprising a system for transporting a plurality of bead-cores with aligned centers comprising, a slide with a plurality of housing seats, each seat being constituted by a base for bearing the bead-core and by lateral walls for containing the sides of the bead-cores, means for driving the slide in a direction parallel to the drum axis, means capable of applying a tangential thrust to the profile of the bead-core for movement from the housing seat to said loading cradle.

16. The apparatus of claim 1 or 2, comprising a driving mechanism for opening the drum comprising two flanges capable of being associated with each other for encasing a bead-core and capable of being separated for discharge of the bead-core with the filler.

17. The apparatus of claim 16 wherein said driving mechanism acts on a drum constituted by two flanges assembled to idle on the respective first and second shafts with aligned axes and with the second shaft capable of being moved axially with respect to the first one, said driving mechanism comprising means for moving the second shaft with respect to the first in opposition to a coiled spring, said coiled spring being applied in the position of the second shaft downline of the relative flange to exert a compression action of the second flange with respect to the first one, said means for moving the second shaft with respect to the first one being adapted to apply a force at least equal and opposite to that of the spring for the detachment of the second flange with respect to the first one.

18. The apparatus of claim 17, wherein said means for moving the second shaft with respect to the first one comprise a fluid-dynamic cylinder on the frame, an appendix applied perpendicularly to the free end of the second shaft, a hook associated with the end of the stem of the fluid-dynamic cylinder, said hook being placed at a distance from said appendix and in abutment on the appendix when said stem is set in action to interfere and to exert on said appendix a force equal and opposite to that of said spring.

19. The apparatus of claim 18, comprising three drums wherein said first flanges idle on first shafts associated with the end of a first group of three arms inclined to one another at 120°, the second flanges idle on second shafts of a second group of three arms inclined with respect to one another at 120°, said two groups being associated with the same central shaft and wherein said fluid-dynamic cylinder for opening the flanges is arranged with its stem parallel to the axis of the central shaft in a position reached cyclically by each drum for loading the bead-core and for discharging the bead-core with filler.

* * * * *